United States Patent
Suontila et al.

(10) Patent No.: US 8,346,318 B2
(45) Date of Patent: *Jan. 1, 2013

(54) COVER

(75) Inventors: Eero Suontila, Ulm (DE); Franz Pfeiffer, Ulm (DE); Sandra Kimmig, Neu-Ulm (DE); Tim Sobig, Ulm (DE); Ulrich Buschmann, Rammingen (DE)

(73) Assignee: Nokia Corporation, Espoo (FI)

( * ) Notice: Subject to any disclaimer, the term of this patent is extended or adjusted under 35 U.S.C. 154(b) by 13 days.

This patent is subject to a terminal disclaimer.

(21) Appl. No.: 13/001,123

(22) PCT Filed: Jun. 25, 2009

(86) PCT No.: PCT/EP2009/058007
§ 371 (c)(1),
(2), (4) Date: Feb. 23, 2011

(87) PCT Pub. No.: WO2009/156490
PCT Pub. Date: Dec. 30, 2009

(65) Prior Publication Data
US 2011/0143084 A1    Jun. 16, 2011

(30) Foreign Application Priority Data
Jun. 25, 2008 (GB) .................................. 0811632.9

(51) Int. Cl.
*H04M 1/00* (2006.01)
(52) U.S. Cl. ............... 455/575.1; 455/556.2; 455/575.3; 455/90.3; 379/433.01; 361/679.02
(58) Field of Classification Search ............. 455/575.1, 455/550.1, 556.2, 575.3, 90.3, 418; 379/433.01; 361/679.02, 679.26; 348/14.02
See application file for complete search history.

(56) References Cited

U.S. PATENT DOCUMENTS

| | | | |
|---|---|---|---|
| 5,139,319 A | 8/1992 | Miyai et al. | 312/7.1 |
| 5,638,455 A | 6/1997 | Peiker | 381/361 |
| 6,006,074 A | 12/1999 | De Larminat et al. | 455/90 |

(Continued)

FOREIGN PATENT DOCUMENTS

DE    102 36 810 A1    2/2004

(Continued)

*Primary Examiner* — Shaima Q Aminzay
(74) *Attorney, Agent, or Firm* — Harrington & Smith

(57) ABSTRACT

A user replaceable cover for attachment to and detachment from an apparatus including a first lateral part extending in a first direction, a second lateral part disposed opposite the first lateral part and extending in the first direction, a posterior part extending substantially in a second direction orthogonal to the first direction and joining the first lateral part and the second lateral part and an upper part having extremities and joining at the extremities the first lateral part, the second lateral part and the posterior part, wherein each of the first lateral part, the second lateral part, the posterior part and the upper part has an interior surface and an exterior surface, the user replaceable cover further including a plurality of sidewalls defined by the first lateral part, the second lateral part and the posterior part, wherein the sidewalls terminate at a lower edge for abutment with the apparatus; a face defined by the exterior surface of the upper part; an anterior edge defined at where the first lateral part, the second lateral part and the upper part terminate for abutment with the apparatus; a first posterior tenon extending from the interior surface of the posterior part; a second posterior tenon extending from the interior surface of the posterior part; and an anterior tenon extending from the anterior edge of the first lateral part.

15 Claims, 3 Drawing Sheets

U.S. PATENT DOCUMENTS

| | | | |
|---|---|---|---|
| 6,135,582 A | 10/2000 | Schuelke et al. | 312/223.1 |
| 6,382,448 B1 | 5/2002 | Yuhara et al. | 220/4.02 |
| 6,479,184 B1 | 11/2002 | Shiue | 429/123 |
| 7,805,172 B2 | 9/2010 | Joo | 455/575.8 |
| 2002/0127975 A1 | 9/2002 | Hsu | 455/90 |
| 2003/0043535 A1 | 3/2003 | Wang et al. | 361/683 |
| 2004/0045961 A1 | 3/2004 | Pan | 220/4.02 |
| 2004/0203502 A1 | 10/2004 | Dietrich et al. | 455/90.3 |
| 2004/0262180 A1 | 12/2004 | Qin et al. | 206/320 |
| 2004/0263482 A1 | 12/2004 | Goertz | 345/173 |
| 2005/0260386 A1 | 11/2005 | Heinrich et al. | 428/141 |
| 2005/0271200 A1 | 12/2005 | Hu et al. | 379/433.11 |
| 2006/0128417 A1 | 6/2006 | Wilson | 455/550.1 |
| 2006/0148442 A1 | 7/2006 | Liu et al. | 455/347 |
| 2007/0015477 A1 | 1/2007 | Tu et al. | 455/128 |
| 2007/0243911 A1* | 10/2007 | Saito | 455/575.1 |
| 2008/0015934 A1 | 1/2008 | Kim et al. | 705/14 |
| 2008/0227507 A1 | 9/2008 | Joo | 455/575.8 |

FOREIGN PATENT DOCUMENTS

| | | |
|---|---|---|
| DE | 10 2008 008 671 A1 | 9/2008 |
| EP | 0 932 288 A1 | 7/1999 |
| EP | 1 244 276 A2 | 9/2002 |
| EP | 1 467 540 B1 | 5/2006 |
| EP | 1 717 781 A1 | 11/2006 |
| JP | 2006-278978 | 10/2006 |
| WO | WO 97/35414 | 9/1997 |
| WO | WO 2005/067267 A1 | 7/2005 |

* cited by examiner

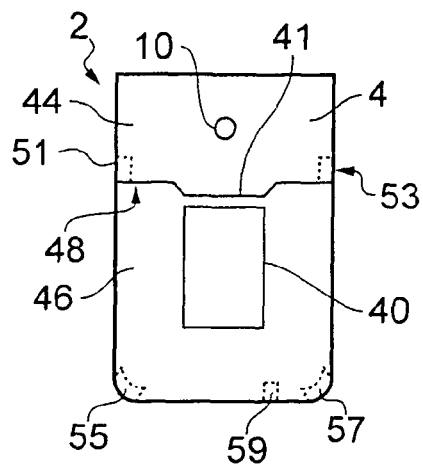
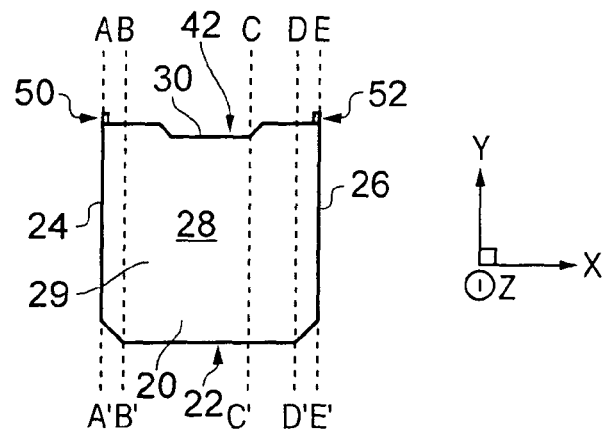
FIG. 3A    FIG. 3B
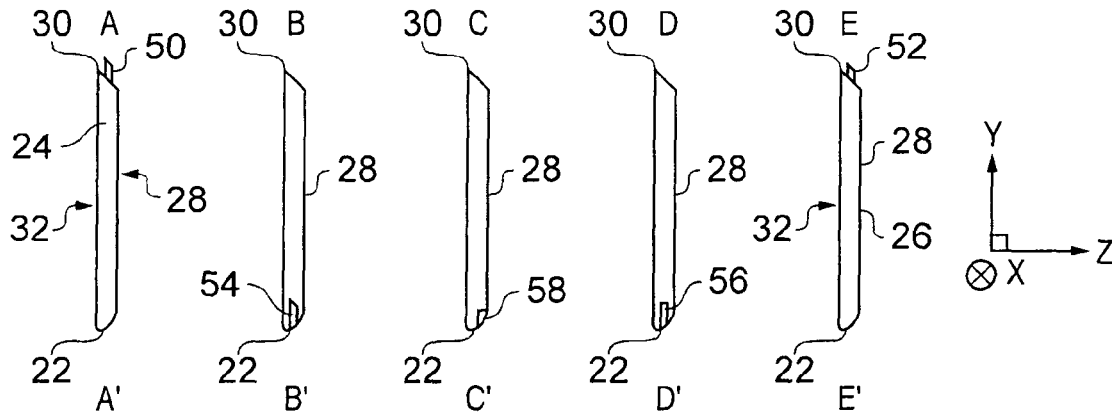
FIG. 4A  FIG. 4B  FIG. 4C  FIG. 4D  FIG. 4E
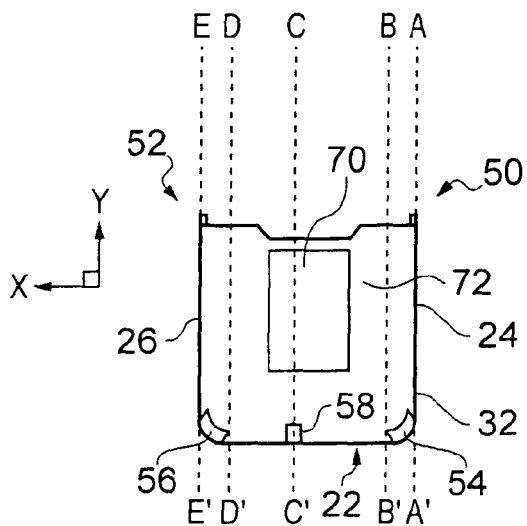
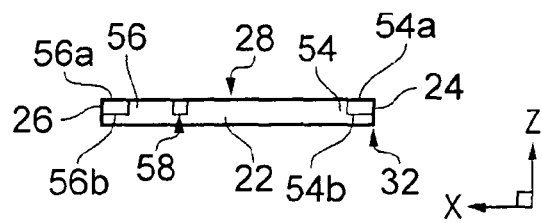
FIG. 5B
FIG. 5A

COVER

FIELD OF THE INVENTION

Embodiments of the present invention relate to a cover. Some embodiments relate to a user replaceable cover for a flip part of an apparatus that overlies and protects a display of the flip part.

BACKGROUND TO THE INVENTION

Apparatuses with flip parts are known, such as clamshell mobile telephones.

Typically the flip part is provided to protect a display of the apparatus which is placed on the interior surface of the flip part. When the flip part is in the closed configuration, the display is protected. When the flip part is in the open configuration, the display is exposed.

A problem arises if one wishes to display information to a user while the flip part is in the closed configuration. If one places a further display on the exterior surface of the flip part, the further display is exposed in the closed configuration and may be damaged.

BRIEF DESCRIPTION OF VARIOUS EMBODIMENTS OF THE INVENTION

According to various, but not necessarily all, embodiments of the invention there is provided a cover for an apparatus having a light emitting display, the cover comprising: a substrate defining a three dimensional shape of the cover and configured to engage with the apparatus, the substrate having a first part configured to be translucent and being positioned to overlie the display, wherein when the cover is attached to the apparatus, an output of the display is visible through the first part of the cover.

This enables a display to be available at the exterior of a flip part without placing the display itself on the exterior of the flip part. The display itself is protected from scratching by the cover which extends over the display. The translucent as opposed to transparent nature of the cover means that its optical properties are less affected by scratches.

According to various, but not necessarily all, embodiments of the invention there is provided a user replaceable cover for user attachment to and user detachment from a flip part of an apparatus having a light emitting display, the cover comprising: a substrate defining a three dimensional shape of the cover and configured to engage with the flip part of the apparatus, the substrate having a first part positioned to overlie the display, wherein when the cover is attached to the flip part of the apparatus, an output of the display is visible through the first part of the cover.

This enables a display to be placed on the exterior of a flip part. The display itself is protected from scratching by the cover which extends over the display. If the cover becomes damaged it can be replaced.

According to various, but not necessarily all, embodiments of the invention there is provided a user replaceable cover for attachment to and detachment from an apparatus comprising: a first lateral part extending in a first direction, a second lateral part disposed opposite the first lateral part and extending in the first direction, a posterior part extending substantially in a second direction orthogonal to the first direction and joining the first lateral part and the second lateral part, and an upper part having extremities and joining at the extremities the first lateral part, the second lateral part and the posterior part, wherein each of the first lateral part, the second lateral part, the posterior part and the upper part has an interior surface and an exterior surface, the user replaceable cover further comprising: a plurality of sidewalls defined by the first lateral part, the second lateral part and the posterior part, wherein the sidewalls terminate at a lower edge for abutment with the apparatus; a face defined by the exterior surface of the upper part; an anterior edge defined at where the first lateral part, the second lateral part and the upper part terminate for abutment with the apparatus; a first posterior tenon extending from the interior surface of the posterior part; a second posterior tenon extending from the interior surface of the posterior part; and an anterior tenon extending from the anterior edge of the first lateral part.

The user replaceable cover may be attached to an apparatus and, in particular, a flip part of an apparatus without undermining the structural integrity of the flip part. The means for attaching the cover to the flip part uses projections extending from the interior surface of the posterior part and the anterior edge of a lateral part. The corresponding receptacles for receiving the projections are not positioned at the lateral edges of the flip part of the cover and this maintains the strength of the flip part 4.

BRIEF DESCRIPTION OF THE DRAWINGS

For a better understanding of various examples of embodiments of the present invention reference will now be made by way of example only to the accompanying drawings in which:

FIG. 3A illustrates, from a plan view, the apparatus with a cover removed;

FIG. 3B illustrates, from a plan view, the exterior of the removed cover;

FIGS. 4A-4E illustrates, from a side view, cross-sections of the removed cover along the lines AA', BB', CC', DD', EE' of FIG. 3B;

FIG. 5A illustrates, from a plan view, the interior of the removed cover;

FIG. 5B illustrates, from an end view, the interior surface of the posterior part of the removed cover;

DETAILED DESCRIPTION OF VARIOUS EMBODIMENTS OF THE INVENTION

Figure 6A:
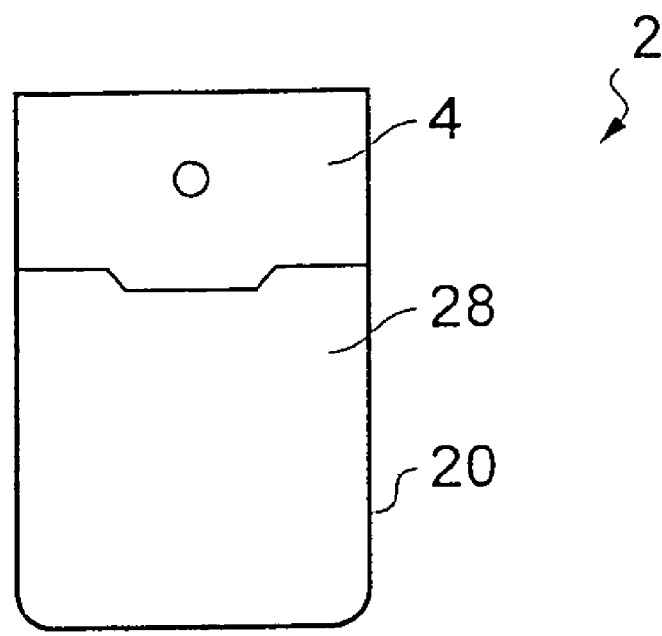
FIG. 6A illustrates, from a plan view, the apparatus in a closed configuration while it is in use with the removable cover attached and a display underneath the attached removable cover is not activated.
Figure 6B:
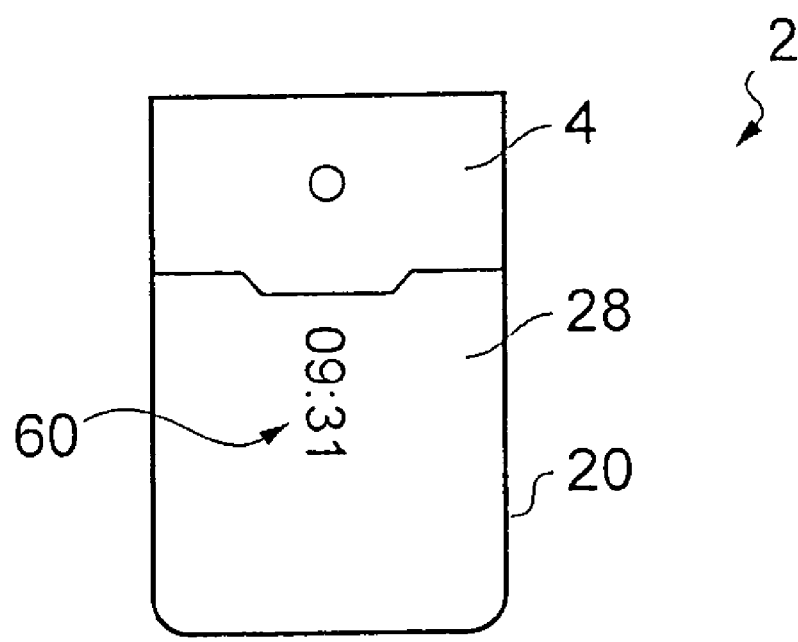
FIG. 6B illustrates, from a plan view, the apparatus in a closed configuration while it is in use with the removable cover attached and a display underneath the attached removable cover is activated and the content of the display is visible through the cover.

FIG. 6A illustrates, from a plan view, an apparatus 2 in a closed configuration while it is in use with a removable cover 20 attached. A display 40 (FIG. 3A) positioned underneath the attached removable cover and is not activated. FIG. 6B illustrates, from the same plan view, the apparatus 2 when the display 40 underneath the attached removable cover 20 is activated and content 60 of the display 40 is visible through the cover but the display 40 itself is not. The display 40 is therefore hidden behind the cover 40 until the display is activated i.e. its is "hidden 'til lit".

The cover 20 may be a user replaceable cover for a flip part 4 of the apparatus 2. The apparatus 2 is described in more detail in relation to FIGS. 1A, 1B, 2A and 2B and the special means for attaching the cover 20 to the flip part 4 without compromising the structural integrity of the thin flip part 4 is described in relation to FIGS. 3A-B, 4A-E, 5A-B.

Figure 1A:
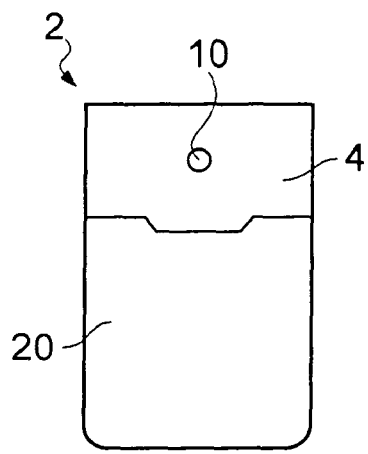
FIG. 1A illustrates, from a plan view, an apparatus in a closed configuration.
Figure 1B:
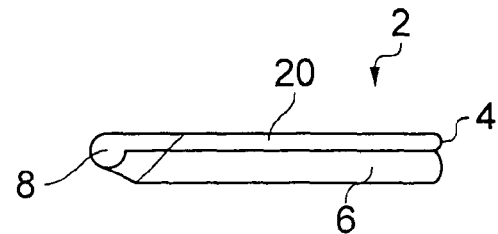
FIG. 1B illustrates, from a side view, the apparatus in the closed configuration.
Figure 2A:
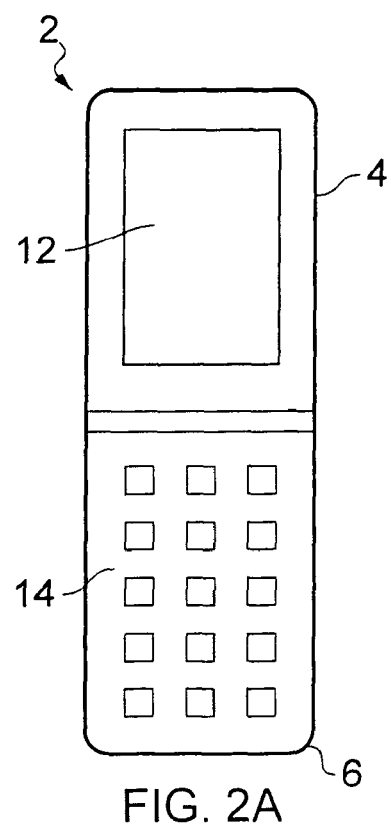
FIG. 2A illustrates, from a plan view, the apparatus in an open configuration.
Figure 2B:
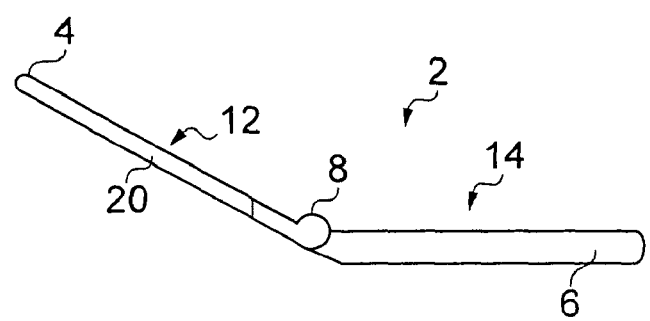
FIG. 2B illustrates, from a side view, the apparatus in the open configuration.

In more detail, FIG. 1A illustrates, from a plan view, the apparatus 2 in a closed configuration, FIG. 1B illustrates, from a side view, the apparatus in the closed configuration, FIG. 2A illustrates, from a plan view, the apparatus 2 in an open configuration; and FIG. 2B illustrates, from a side view, the apparatus 2 in the open configuration.

The apparatus 2 may be a mobile electronic device such as a hand-portable electronic device. The apparatus 2 may be, for example, a personal music player, a personal computer, a e-book reader, a personal digital assistant, a mobile cellular telephone etc.

The apparatus 2 comprises a first part 4 and a second part 6. The first part 4 and the second part 6 are arranged for relative rotation movement about a hinge 8 between the closed configuration (FIGS. 1A, 1B) and the open configuration (FIGS. 2A, 2B).

The first part is a thin flip that can flipped by a user's finger to change the configuration of the apparatus 2 between open and closed. The flip typically has a metal chassis and is stiff.

The hinge 8 may be biased to have two stable positions corresponding to the open configuration and the closed configuration respectively.

In this example, a camera port 10 is located on an exterior of the flip part 4.

The flip part 4 has a cover 20 that can be replaced or interchanged by a user. The user is able to remove the cover 20 without the use of specialized tools using only their hand and the user is able to attach another cover 20 without the use of specialized tools using only their hand.

Referring to FIG. 2A, the interior of flip part 4 in this example has a large display 12 and the interior of second part 6 has a user input device 14 such as a keypad.

FIG. 3A illustrates, from a plan view, the apparatus 2 with the cover 20 removed.

The flip part 4 comprises: display 40 and a plurality of receptacles. The receptacles are designed to received projections defined on an anterior edge 30 of the cover 20 and on the interior surface of a posterior part 22 of the cover 20.

The receptacles include a first anterior lateral receptacle 51, a second anterior lateral receptacle 53, a first posterior receptacle 55, a second posterior receptacle 57, a third posterior receptacle 59.

The display may be, for example, a light emitting display such as an organic light emitting diode (OLED) display. A light emitting display generates the light required to enable its content to be visible as opposed to a reflectance display which modulates reflected ambient light.

The exposed flip part 4 has a raised portion 44, a lower portion 46 and a step 48 joining the raised portion 44 and the lower portion 46. The lower portions has edges along its lateral and posterior sides for abutment with sidewalls of the cover 20.

The cover 20 is illustrated in FIGS. 3B, 4A-4E and 5A-B. FIG. 3B illustrates, from a plan view of the face 29 of the cover 20, an exterior of the removed cover 20. FIGS. 4A-4E illustrate, from a side view, cross-sections of the removed cover along the lines AA', BB', CC', DD', EE' which are defined in FIG. 3B and run in the Y direction. FIG. 5A illustrates, from a plan view, an interior of the removed cover. FIG. 5B illustrates, from an end view, the interior of the posterior part 22 of the removed cover 20;

The cover 20 is in this example a unitary one-piece molded three dimensional cover 20 and comprises a posterior part 22, a first lateral part 24, a second lateral part 26 and an upper part 28. Each part has an exterior surface and an interior surface.

A co-ordinate reference system is defined to aid description of the cover parts. The co-ordinate reference system comprises three mutually orthogonal vectors X, Y, Z.

The first lateral part 24 has a height h in the Z direction and extends lengthwise in the Y direction. It is narrow in the X direction and forms a sidewall of the cover 20.

The second lateral part 26 is disposed opposite the first lateral part 24. The second lateral part 26 has a height h in a Z direction and extends lengthwise in the Y direction parallel to the first lateral part 24. The second lateral part 26 is narrow in the X direction and forms a sidewall of the cover 20.

The posterior part 22 has a height h in a Z direction and extends lengthwise in the X direction. It is narrow in the Y direction and forms a sidewall of the cover 20.

The posterior part 22, the first lateral part 24 and the second lateral part 26 join together and form the sidewalls of the cover 20. The sidewalls terminate at a lower edge 32 creating runners for sliding abutment with ledges of the apparatus 2.

The upper part 28 defines a face 29 of the cover 20. The upper part 28 joins the first lateral part 24, the second lateral part 26 and the posterior part 22 at the extremities of the face 29.

An anterior edge 30 of the cover 20 is defined where the first lateral part 24, the second lateral part 26 and the upper part 28 terminate for abutment with the apparatus 2.

The cover 20 comprises: a first anterior lateral projection 50; a second anterior lateral projection 52; a first posterior projection 54; a second posterior projection 56 and a third posterior projection 58.

A first anterior lateral receptacle 51 is defined adjacent a first lateral edge of the step 48 of the flip part 4 and is sized to receive a first anterior lateral projection 50 of the cover 20 when the cover 20 is slid into an attached position. The first anterior lateral projection extends in the Y direction from the anterior edge 30 of the first lateral part 24. The first anterior lateral receptacle 51 has a substantially rectangular shaped opening in the step 48 and a cross-section of the first anterior lateral projection 50 of the cover 20 has a corresponding substantially conforming rectangular shape. The first anterior lateral receptacle 51 may operate as a mortise and the first anterior lateral projection 50 may operate as an tenon when the cover 20 is attached to the flip part 4. The engaging combination of the first anterior lateral projection 50 and the first anterior lateral receptacle 51 prevents the cover 20 being lifted-off the flip part 4 in the Z direction unless it is first slid in the Y-direction to disengage the projection 50 from the receptacle 51.

A second anterior lateral receptacle 53 is defined at the other second lateral edge of the step 48 and is sized to receive a second anterior lateral projection 52 of the cover 20 when the cover 20 is slid into an attached position. The first anterior lateral projection extends in the Y direction from the anterior edge 30 of the second lateral part 26. The second anterior lateral receptacle 53 has a substantially rectangular shaped opening in the step 48 and a cross-section of the second anterior lateral projection 52 of the cover 20 has a corresponding substantially conforming rectangular shape. The second anterior lateral receptacle 53 may operate as a mortise and the second anterior lateral projection 52 may operate as an engaging tenon when the cover 20 is attached to the flip part 4. The engaging combination of the second anterior lateral projection 52 and the second anterior lateral receptacle 53 prevents the cover 20 being lifted-off the flip part 4 in the Z direction unless it is first slid in the Y-direction to disengage the projection 52 from the receptacle 53.

The first lateral edge and the second lateral edge of the step 48 of the flip part 4 have symmetrically sloped profiles that substantially conform to sloped profiles of the lateral parts 24, 26 of the cover 20 where they terminate at the anterior edge 30. The abutment of the conforming sloped profiles when the cover 20 is attached to the flip part 4 constrain movement of the cover 20 and prevent the cover 20 being lifted-off the flip part 4 in the Z direction unless it is first slid in the Y-direction to disengage the sloped profiles.

A first posterior receptacle 55 is defined under the posterior edge of the lower portion 46 towards its first lateral edge and is sized to receive a first posterior projection 54 of the cover 20. The first posterior projection 54 of the cover 20 extends in the Y direction from the interior surface of the posterior part 22 of the cover 20. The receptacle 55 has a substantially _| shaped opening in the step 48 that extends to the surface of the lower portion 46 of the exposed flip part 4 and extends towards but not to the first lateral edge of the flip part 4. The cross-section of the first posterior projection 54 of the cover 20 in the XZ plane has a corresponding substantially conforming L shape.

The first posterior receptacle 55 may operate as two orthogonally disposed and interconnected mortises and the first posterior projection 54 may operate as two correspondingly disposed tenons that are received by the interconnected mortises when the cover 20 is attached to the flip part 4. The two correspondingly disposed tenons include a laterally extending tenon 54B and a vertically extending tenon 54A.

The laterally extending tenon 54B extends in Y direction and the X direction. An engagement gap is defined between the laterally extending tenon 54B and the interior surface of the upper part 28. When the cover 20 is attached to the flip part 4 of the apparatus 2 a portion of the flip part 4 intercedes within the gap and constrains movement in Z direction. The engaging combination of the laterally extending tenon 54B and the first posterior receptacle 55 prevents the cover 20 being lifted-off the flip part 4 in the Z direction unless it is first slid in the Y-direction to disengage the tenon 54B from the receptacle 55.

The vertically extending tenon 54A extends in Y direction and the Z direction. An engagement gap is defined between the vertically extending tenon 54A and the interior surface of the first lateral part 24. When the cover 20 is attached to the flip part 4 of the apparatus 2 a portion of the flip part 4 intercedes within the gap and constrains movement in X direction. The engaging combination of the vertically extending tenon 54A and the first posterior receptacle 55 prevents the cover 20 being moved in the X direction unless it is first slid in the Y-direction to disengage the tenon 54A from the receptacle 55.

The first posterior projection 54 may be resiliently deformable and operate as a detent or latch for user releasable securing of the cover to the flip part 4 of the apparatus 2.

A second posterior receptacle 57 is defined under the posterior edge of the lower portion 46 towards its second lateral edge and is sized to receive a second posterior projection 56 of the cover 20. The second posterior projection 56 of the cover 20 extends in the Y direction from the interior surface of the posterior part 22 of the cover 20. The second posterior receptacle 55 has a substantially L shaped opening in the step 48 that extends to the surface of the lower portion 46 of the exposed flip part 4 and extends towards but not to the second lateral edge of the flip part 4. The cross-section of the second posterior projection 56 of the cover 20 in the XZ plane has a corresponding substantially conforming L shape.

The second posterior receptacle 57 may operate as two orthogonally disposed and interconnected mortises and the second posterior projection 56 may operate as two correspondingly disposed tenons that are received by the interconnected mortises when the cover 20 is attached to the flip part 4. The two correspondingly disposed tenons include a laterally extending tenon 56B and a vertically extending tenon 56A.

The laterally extending tenon 56B extends in the Y direction and the X direction. An engagement gap is defined between the laterally extending tenon 56B and the interior surface of the upper part 28. When the cover 20 is attached to the flip part 4 of the apparatus 2 a portion of the flip part 4 intercedes within the gap and constrains movement in Z direction. The engaging combination of the laterally extending tenon 56B and the second posterior receptacle 57 prevents the cover 20 being lifted-off the flip part 4 in the Z direction unless it is first slid in the Y-direction to disengage the tenon 56B from the receptacle 57.

The vertically extending tenon 56A extends in the Y direction and the Z direction. An engagement gap is defined between the vertically extending tenon 56A and the interior surface of the first lateral part 24. When the cover 20 is attached to the flip part 4 of the apparatus 2 a portion of the flip part 4 intercedes within the gap and constrains movement in X direction. The engaging combination of the vertically extending tenon 56A and the second posterior receptacle 57 prevents the cover 20 being moved in the X direction unless it is first slid in the Y-direction to disengage the tenon 56A from the receptacle 57.

The second posterior projection 56 may be resiliently deformable and operate as a detent or latch for user releasable securing of the cover to the flip part 4 of the apparatus 2.

A third posterior receptacle 59 is defined under the posterior edge of the lower portion 46 and is sized to receive a third posterior projection 58 of the cover 20. The third posterior projection may be a nubbin or lug extending from the interior surface of the posterior part 22 of the cover 20

The receptacle 59 has a rectangular shaped opening in the step 48 that extends to the surface of the lower portion 46 of the exposed flip part 4 but does not extend to the lateral edges of the flip part 4. The cross-section of the third posterior projection 58 of the cover 20 has a corresponding substantially conforming rectangular shape. The nubbin or lug 58 engages the receptacle 59 when the cover is attached to the apparatus 2. It prevents movement of the cover 20 in the X direction.

A projection 41 is defined in the step 48 of the flip part 4 of the apparatus 2. The projection 41 is at a midpoint along the length of the step 48 and is for the full height h of the step 48 and is sized to be received by a recess 42 in the face 29 of the cover 20. The recess 42 is in the form of a cut-out from the upper part 28 of the cover that results in a discontinuity in the anterior edge 30. The projection 41 may operate as a tenon and the recess 42 may operate as a mortise when the cover 20 is attached to the flip part 4. The engaging combination of the projection 41 and the recess 42 prevents the cover 20 being moved in the X direction unless it is first slid in the Y-direction to disengage the projection 41 from the receptacle 42.

The cover 20 is fitted to the flip part 4 by placing the lower edge 32 of the cover so that it straddles the lower portion 46 and abuts the edges of the lower portion 46 of the flip part 4 of the apparatus 2. The cover 20 is then slid in the Y direction until the anterior edge 30 of the cover 20 abuts the step 48 of the flip part 4 of the apparatus 2 and the tenons 41, 50, 52, 54, 56, 58 slidingly engage their respective mortises 42, 51, 53, 55, 57, 59.

The receptacles 51, 53, 55, 57 and 59 do not extend to the lateral edges of the flip part 4. Consequentially the structural integrity of the flip part is maintained while enabling the user attachment and detachment of a cover 20.

FIG. 6A illustrates, from a plan view, an apparatus 2 in a closed configuration while it is in use with a removable cover 20 attached. The display 40 positioned underneath the attached removable cover 20 and is not activated. FIG. 6B illustrates, from the same plan view, the apparatus 2 when the display 40 underneath the attached removable cover 20 is activated. A content 60 of the display 40 is visible through the cover but the display 40 itself is not. The display 40 is therefore hidden behind the cover 40 until the display is activated i.e. its is "hidden 'til lit".

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A user replaceable cover for attachment to and detachment from an apparatus comprising:
a first lateral part extending in a first direction, a second lateral part disposed opposite the first lateral part and extending in the first direction, a posterior part extending substantially in a second direction orthogonal to the first direction and joining the first lateral part and the second lateral part and an upper part having extremities and joining at the extremities the first lateral part, the second lateral part and the posterior part, wherein each of the first lateral part, the second lateral part, the posterior part and the upper part has an interior surface and an exterior surface, the user replaceable cover further comprising:
a plurality of sidewalls defined by the first lateral part, the second lateral part and the posterior part, wherein the sidewalls terminate at a lower edge for abutment with the apparatus;
a face defined by the exterior surface of the upper part; an anterior edge defined at where the first lateral part, the second lateral part and the upper part terminate for abutment with the apparatus;
a first posterior tenon extending from the interior surface of the posterior part; a second posterior tenon extending from the interior surface of the posterior part; and
an anterior tenon extending from the anterior edge of the first lateral part.

2. A user replaceable cover as claimed in claim 1, further comprising a second anterior tenon extending from the anterior edge of the second lateral part.

3. A user replaceable cover as claimed in claim 1, further comprising a posterior nubbin extending from the interior surface of the posterior part for constraining movement of the cover when the cover is attached to the apparatus.

4. A user replaceable cover as claimed in claim 1, wherein the upper part is shaped to form a mortise in the face at the anterior edge that is sized and positioned to abut with a tenon of the apparatus and thereby constrain a lateral movement of the cover with respect to the apparatus when the cover is attached to the apparatus.

5. A user replaceable cover as claimed in claim 1, wherein the first and second lateral parts have a symmetrically sloped profiles at the anterior edge to constrain movement of the cover while the cover is attached to the apparatus.

6. A user replaceable cover as claimed in claim 1, wherein the first posterior tenon defines an engagement gap between the first posterior tenon and the interior surface of the upper part.

7. A user replaceable cover as claimed in claim 1, wherein the first posterior tenon defines an engagement gap between the first posterior tenon and the interior surface of the first lateral part.

8. A user replaceable cover as claimed in claim 1, wherein the second posterior tenon defines an engagement gap between the second posterior tenon and the interior surface of the upper part.

9. A user replaceable cover as claimed in claim 1, wherein the second posterior tenon defines an engagement gap between the second posterior tenon and the interior surface of the second lateral part.

10. A user replaceable cover as claimed in claim 1, wherein the first lateral part, the second lateral part, the posterior part and the upper part are formed from a single piece of molded plastic substrate.

11. A cover for an apparatus having a light emitting display, the cover comprising: a substrate defining a three dimensional shape of the cover and configured to engage with the apparatus, the substrate having a first part configured to be translucent and being positioned to overlie the display, wherein when the cover is attached to the apparatus, an output of the display is visible through the cover but the display is not visible, and further comprising: a plurality of sidewalls defined by the first lateral part, the second lateral part and the posterior part, wherein the sidewalls terminate at a lower edge for abutment with the apparatus; a face defined by the exterior surface of the upper part; an anterior edge defined at where the first lateral part, the second lateral part and the upper part terminate for abutment with the apparatus; a first posterior tenon extending from the interior surface of the posterior part; a second posterior tenon extending from the interior surface of the posterior part; and an anterior tenon extending from the anterior edge of the first lateral part.

12. A cover as claimed in claim 11 comprising a first lateral part extending in a first direction, a second lateral part disposed opposite the first lateral part and extending in the first direction, a posterior part extending substantially in a second direction orthogonal to the first direction and joining the first lateral part and the second lateral part and an upper part having extremities and joining at the extremities the first lateral part, the second lateral part and the posterior part, wherein each of the first lateral part, the second lateral part, the posterior part and the upper part has an interior surface and an exterior surface.

13. A cover as claimed in claim 11, configured to be user interchangeable with a cover attached to the apparatus.

14. A cover as claimed in claim 11, configured to be user attachable and user detachable from a flip part of the apparatus, wherein the flip part has a light emitting display, and the substrate is configured to engage with the flip part of the apparatus, such that when the cover is attached to the flip part of the apparatus, an output of the display is visible through the cover.

15. An apparatus comprising a cover as claimed in claim 11.

* * * * *